F. REICHENBACH.
DEVICE FOR SUPPLYING COLD WATER TO GAS ENGINE PISTONS.
APPLICATION FILED JUNE 11, 1908.

992,986.

Patented May 23, 1911.

UNITED STATES PATENT OFFICE.

FRITZ REICHENBACH, OF GRUNEWALD, NEAR BERLIN, GERMANY.

DEVICE FOR SUPPLYING COLD WATER TO GAS-ENGINE PISTONS.

992,986.  Specification of Letters Patent.  Patented May 23, 1911.

Application filed June 11, 1908. Serial No. 437,922.

*To all whom it may concern:*

Be it known that I, FRITZ REICHENBACH, a subject of the German Emperor, and resident of Grunewald, near Berlin, Germany, have invented certain new and useful Devices for Supplying Cold Water to Gas-Engine Pistons, of which the following is a specification.

The present invention relates to a device for feeding cooling water to the pistons of gas engines in which is utilized in the known manner the accelerating and retarding forces or the forces produced by the inertia of the moving mass of water. In accordance with the present invention this is done merely by opening differently large cross-sectional inlet and outlet areas of the pipe which serves for the introduction of the water.

The accompanying drawings show two embodiments of the improved device.

Figure 2:
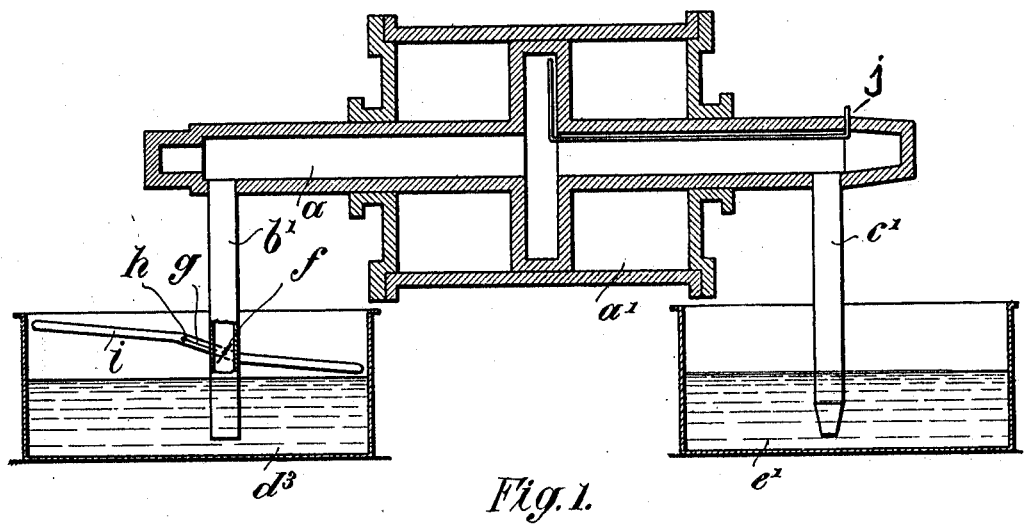
Figure 1:
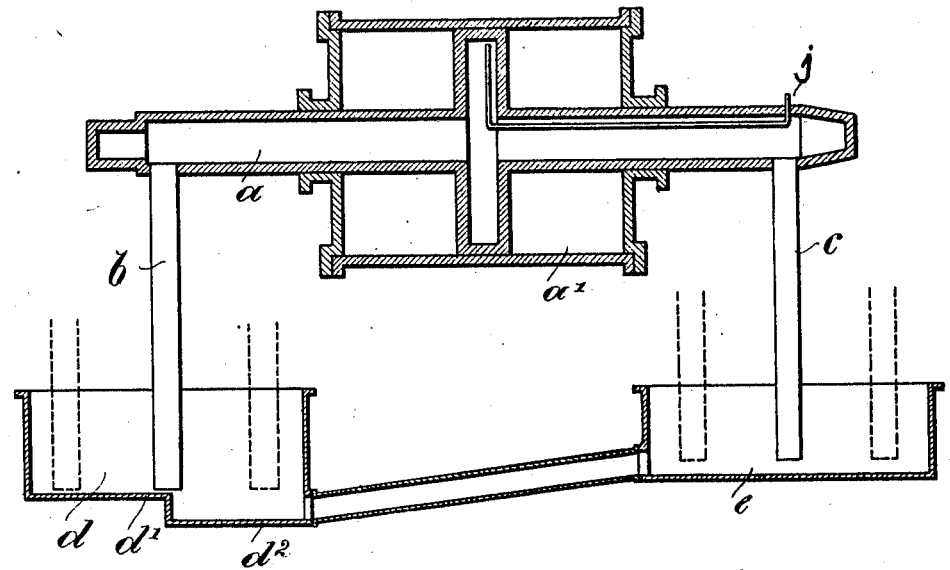

Figure 1 is a longitudinal sectional elevation of one form of the device; and Fig. 2 a like view of a modified form.

In Fig. 1 the piston $a$ is shown in the intermediate position. $b$ and $c$ are two pipes which open into the vessels $d$ and $e$, and are secured to the hollow piston rod. When the piston moves toward the left and reverses its motion and again returns to the intermediate position the inertia of the water causes the water in the piston to pass out toward the left. When the piston reaches the right dead center position and reverses its motion the water passes out toward the right. The same water would therefore always be in the piston and the pison rod and this water would be too warm and could not effect a sufficient cooling. Care must therefore be taken that the water in the piston is always renewed. For that purpose the bottom of the vessel $d$ is horizontal and stepped so as to form two steps $d'$ and $d^2$. The bottom of the other vessel ($e$) is horizontal. The distance of the bottom of the vessel $e$ from the end of the pipe is greater than the distance of the bottom $d'$ and smaller than the distance of the bottom $d^2$. The cross-sectional areas are selected in such a manner that the cross-sectional area between the pipe and the step $d'$ is for instance 10 square centimeters and the cross-sectional area between the pipe $b$ and the step $d^2$ is 1000 square centimeters while the cross-sectional area in the right-hand vessel is about 100 square centimeters. Through these 100 square centimeters as much water can pass in as can pass out through the 10 square centimeters of the step $d'$ during the movement of the piston from the left dead center position, when, for instance, the accelerating pressure is very high, say about 9 atmospheres at the end of the pipe $c$. However, as the accelerating forces do not ordinarily produce such a high pressure the water column does not become split up. When the piston moves from the intermediate position toward the right and back to the intermediate position the water passes out toward the right through the cross-sectional area of 100 square centimeters. Throughout this path the bottom of the step $d^2$ is much deeper so that an inlet cross-sectional area of 1000 square centimeters is open. Through these 1000 square centimeters as much water can pass in as can pass out on the other side at a high accelerating pressure of approximately 9 atmospheres at the end of pipe $b$. Also in this case the water column therefore does not become split up. The amounts of water which pass out on the two sides are therefore different and correspond to the cross-sectional areas of 100 and 10. At the right ten times as much water therefore passes out as at the left and the right-hand vessel will therefore gradually become filled. In order to prevent over-flow the water may in the known manner be conducted to the left-hand vessel through a pipe and a surface cooler.

In the embodiment shown in Fig. 2 the bottoms of the two vessels $d^3$ and $e'$ are level. The end of the pipe $c'$ which projects into the vessel $e'$ is contracted while the pipe $b'$ which projects into the vessel $d^3$ is provided with a throttle valve $f$ which carries a lever $g$ on its rotary shaft. The end of the lever $g$ is provided with a roller $h$ which engages in a guide-track $i$ which is formed in such a manner that the throttle valve cuts off the pipe $b'$ to a greater or less extent corresponding to the accelerating pressures. The size of the cross-sectional area of the pipe $c'$ is smaller than the greatest cross-sectional area and greater than the smallest cross-sectional area produced by the throttle valve in the pipe $b'$. The throttle valve may also be arranged in the piston rod *per se*. The bottoms of the vessels might also be inclined or stepped when only care is taken that the outlet cross-sectional area is greater for one side than for the other so as to obtain a circulation of the water. On the reversal of the movement of the piston the inertia and the accelerating or retarding forces will cause the water in the piston to become subjected to great pressures which have a tendency to force the water out of the piston. As the piston has a reciprocating movement the water will alternately pass out of the piston to the right and to the left. The same water will therefore always reënter the piston and this water therefore becomes highly heated which has an unfavorable effect on the operation. Care must therefore be taken that fresh water is always supplied to the piston. However, in gas engines which run at a comparatively great speed the inertial and accelerating forces are very great and their effect on the water which passes out is greater than the effect of the atmospheric air on the water which is drawn in by the suction action. The result is that the water column is split up which as commonly known causes showers. However, this must absolutely be prevented and according to the present invention this is done by checking the outflow of the water and causing less water to be forced out from the piston by the inertia than can be forced in by the atmospheric pressure. For that purpose, referring to the construction shown in Fig. 1, the pipe $c$, which serves for the exhaust of the water from the piston, has a certain cross-sectional outlet area which is smaller than the cross-sectional area of the pipe. The cross-sectional inlet area of the pipe $b$, through which the water is adapted to enter the piston, is selected in such a manner that during the suction action in the pipe $b$ caused by the inertia of the water, which action tends to force the water out of the pipe $c$, the cross-sectional inlet area is greater than the cross-sectional outlet area of the pipe $c$. However, when there is a pressure action in the pipe $b$ the cross-sectional inlet area of the pipe $b$ must be so small that less water can pass out of the pipe $b$ than can enter the pipe $c$. As therefore the cross-sectional outlet area of the pipe $b$, while there is a pressure action in the pipe $b$, is smaller than the cross-sectional outlet area of the pipe $c$, which always remains the same, it is evident that less water can pass out through the pipe $b$ than through the pipe $c$ and that the water therefore must gradually pass from the receptacle $d$ into the receptacle $e$ and in this manner the desired circulation of the cooling water is obtained.

The piston and piston rods may be charged with water originally in any suitable manner through an opening in either end of the piston rod. The air in the piston and piston rod will escape through the small open-ended rod $j$, carried by the piston, one end thereof extending to the highest point of the piston, and the other being open to the atmosphere at one end of the rod. It is manifest that if the source of water is higher than the top of the piston the piston may be readily filled with water. The lower ends of the rods $b$ and $c$ and $b'$ and $c'$ are sealed by the water in the tanks and the desired amount of water may be maintained in the piston and the rods by sealing or in any manner closing the outlet end of the pipe $j$.

Having now particularly described and ascertained the nature of my said invention and in what manner the same is to be performed I declare what I claim is:

1. In a device for supplying a cooling liquid to a piston by means of the forces due to the acceleration and retardation of the reciprocating piston, the combination with a hollow piston having two hollow piston rods extending therefrom in opposite directions, two tanks adapted to contain a cooling liquid, a pipe connected to each of said piston rods, the lower ends of said pipes extending below the level of the cooling liquid in each tank, and means whereby the intake of one pipe will be of greater capacity than the outlet from said pipe, the outlet and intake of the other pipe being substantially uniform and less than the intake of the first mentioned pipe.

2. In a device for supplying cold water to a gas-engine piston by means of the forces due to the acceleration and retardation of the reciprocating piston, the combination with a hollow piston having two hollow piston-rods, of two tanks containing water, and two pipes connected with said piston-rods and dipping into the water in said tanks, the bottoms of said tanks being stepped, whereby the cross-sectional areas of the intake and outlet of the pipes are changed in consequence of the shape of the bottoms of the tanks corresponding to the accelerating-pressures in such manner that the cross-sectional area of the passage during the emission period ($d'$) on the one side of the piston is smaller than the cross-sectional area of the passage during the admission period ($d^2$) on the same side, whereas on the contrary the cross-sectional area of the passage on the other side remains the same, but its size is between the sizes of the cross-sectional areas of the passages on the other side.

3. An apparatus of the class described comprising a hollow piston, a hollow piston rod extending therefrom on each side of the piston and in opposite directions, means for supplying water to the interior of said piston rods, and means whereby a greater quantity of water will be caused to flow into one of the piston rods by the inertia of the mass of water in the moving piston than will flow into the other piston rod, whereby water will flow in one direction through the piston rods and piston.

4. A device for supplying cold water to gas engine pistons, the combination with a hollow piston having two hollow piston rods, of means for supplying water to said rods and means for varying the flow of water to one of the piston rods during the reciprocation of the piston, whereby a larger volume of water will flow into one piston rod during a portion of its movement than will flow into the other piston rod, and the water will move in one direction through the piston rods and piston.

5. In a device for supplying cold water to a gas engine piston the combination of a hollow piston having two hollow piston rods extending therefrom in opposite directions, means for supplying water to said rods during the reciprocation of the pistons, means whereby the inertia of the mass of water in the piston and piston rods serves to cause a suction of water into said piston rods, and means for throttling the outlet from one of said rods.

6. In a device for supplying cold water to a gas engine piston the combination of a hollow piston having two hollow piston rods extending therefrom in opposite directions, means for supplying water to said rods during the reciprocation of the pistons, means whereby the inertia of the mass of water in the piston and piston rods serves to cause a suction of water into said piston rods, and means for throttling the outlet from one of said rods during a portion of the piston stroke.

7. A device for moving a liquid from one point to another comprising a reciprocating hollow body, two longitudinally extending hollow rods extending in opposite directions from said body, a depending pipe connected to each of said rods, the lower ends of said rods being sealed by the liquid to be moved whereby the inertia of the mass of liquid in the reciprocating body and the rods carried thereby serve to cause a suction of liquid through the pipes into the said hollow rods, and means for throttling the outlet from one of said rods during a portion of the movement of the reciprocating body.

In witness whereof I have hereunto signed my name this 29 day of May 1908, in the presence of two subscribing witnesses.

FRITZ REICHENBACH.

Witnesses:
WOLDEMAR HAUPT,
HENRY HASPER.